(12) United States Patent
Balachandran et al.

(10) Patent No.: US 7,372,823 B2
(45) Date of Patent: May 13, 2008

(54) METHOD OF TRANSMITTING BROADCAST-MULTICAST SERVICES PARAMETERS MESSAGES IN A WIRELESS COMMUNICATIONS SYSTEM

(75) Inventors: Krishna Balachandran, Morganville, NJ (US); Kenneth C Budka, Marlboro, NJ (US); Arnab Das, Jersey City, NJ (US); Joseph H Kang, Belle Mead, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 627 days.

(21) Appl. No.: 10/805,701

(22) Filed: Mar. 22, 2004

(65) Prior Publication Data
US 2005/0207365 A1    Sep. 22, 2005

(51) Int. Cl.
*H04H 1/00* (2006.01)
(52) U.S. Cl. .................. 370/312; 455/458; 455/503
(58) Field of Classification Search ............. 370/312; 455/414, 452.2, 502, 503, 458
See application file for complete search history.

(56) References Cited
U.S. PATENT DOCUMENTS
2003/0134622 A1* 7/2003 Hsu et al. ............... 455/414
2005/0053023 A1* 3/2005 Rajkotia et al. ........... 370/312
2005/0143085 A1* 6/2005 Bi et al. .................. 455/452.2

* cited by examiner

Primary Examiner—Temica Beamer

(57) ABSTRACT

Rather than transmitting a large full Broadcast-Multicast Services (BCMC) Parameters Message (BSPM) containing a full set of BSPM parameters pertaining to all active BCMC flows within a sector on an infrequent basis, smaller-sized differential or partial BSPMs are instead transmitted. Differential BSPMs contain updated information for existing flows or information for new flows, and because of their smaller size, can be transmitted more frequently than full BSPMs. A mobile terminal receiving a differential BSPM updates the flows with the information contained within the differential BSPM or adds the information contained within the differential BSPM for a new flow. Partial BSPMs divide the flow information contained in a large full BSPM over a plurality of smaller-sized partial BSPMs, which are separately and sequentially transmitted at different times. A mobile terminal receiving these partial BSPMs then reconstructs the full BSPM from a collection of received partial BSPMs.

23 Claims, 3 Drawing Sheets

METHOD OF TRANSMITTING BROADCAST-MULTICAST SERVICES PARAMETERS MESSAGES IN A WIRELESS COMMUNICATIONS SYSTEM

TECHNICAL FIELD

The present invention relates to wireless communications, and more particularly to Broadcast-Multicast (BCMC) Services (BCMCS).

BACKGROUND OF THE INVENTION

Current second generation and third generation wireless systems are primarily designed to support unicast voice and data services. The support of these unicast services to the end user has been achieved through various advances in wireless and networking technologies. A current emphasis in international standardization bodies such as 3GPP and 3GPP2 is on the design of protocols and procedures that allow the support of Broadcast-Multicast Services over evolving networks. BCMCS is a bandwidth-conserving technology that reduces traffic by simultaneously delivering a single stream of information to a large number of recipients. Examples of these services include voice dispatch or Press-To-Talk (PTT) type services, broadcast/multicast streaming, etc.

There has been recent industry interest in the Public Safety Wireless Network (PSWN) context, where support of BCMCS may be especially important in terms of radio resource management. Radio resource management procedures may be needed to achieve low delay in establishment and delivery of BCMC content, to provide scalability in terms of the number of multicast groups and/or number of users per multicast group, to provide advanced service capabilities (e.g., ability to monitor/extract content from multiple BCMC streams), and to reduce unnecessary traffic on one or both of the forward link (base station to mobile terminal) or reverse link (mobile terminal to base station).

In an effort to reduce traffic on the forward and/or reverse link, the above-described radio resource management procedures may include the transmission of a BCMC Services Parameters Message (BSPM) that indicates currently available services and specifies how to access these services (e.g. frequency, channel, demultiplexing indicators, etc.) on the forward link. Transmission of the BSPM can mitigate the need for mobile terminals to transmit registration messages on the reverse link. For example, if the service is available and parameters specifying how to access the service are included, the mobile terminal can skip registration and immediately access the service. Furthermore, if the BSPM can be transmitted in an efficient manner in the forward link, then the goal to reduce traffic on both the forward and reverse links can be achieved.

The BSPM may be exceedingly long as it may be comprised of many parameters required for the reception of BCMC content, including BCMC flow identifiers, Logical to Physical Mappings (LPM), and neighbor information for each BCMC flow. As a result, there may be several issues regarding BSPM transmission. First, it may be difficult to transmit the full set of BSPM parameters pertaining to all active BCMC flows within a sector (henceforth referred to as a "full BSPM") in a single transmission given system requirements (e.g. latency requirements to transmit other overhead messages, pages, multi-slot messages, and so forth). In addition, it may be difficult to transmit the full BSPM frequently on a signaling channel with limited capacity. Infrequent transmissions of BSPMs introduce delays that affect the quality of service and in some cases may preclude the ability to support some services due to intolerable delays.

SUMMARY OF THE INVENTION

In accordance with an embodiment of the present invention, rather than transmitting a large full BSPM containing a full set of BSPM parameters pertaining to all active BCMC flows within a sector on an infrequent basis, smaller-sized differential or partial BSPMs are instead transmitted. Differential BSPMs contain updated information for existing flows or information for new flows, and because of their smaller size, can be transmitted more frequently than full BSPMs. A mobile terminal receiving a differential BSPM updates the flows with the information contained within the differential BSPM or adds the information contained within the differential BSPM for a new flow. Partial BSPMs divide the flow information contained in a large full BSPM over a plurality of smaller-sized partial BSPMs, which are separately and transmitted at different times. A mobile terminal receiving these partial BSPMs then reconstructs the full BSPM from the collection of received partial BSPMs.

The use of partial and/or differential BSPMs can possibly obviate the need to transmit full BSPMs. Also, a differential or partial BSPM can be used to page one or more mobile terminals at the start of a BCMC flow or to end a BCMC flow. Further, a differential or partial BSPM can be used in place of a group page or to provide supplementary information to a group page.

In one embodiment, each full, differential or partial BSPM is transmitted together with an indication of its type, such as by including a flag with each BSPM that is set in accordance with the type of BSPM. For partial BSPMs, signaling can also be included to indicate sequencing, such as indicating a first and/or last partial BSPM and/or including a sequence number in each BSPM. By recognizing the last partial BSPM in a sequence of partial BSPMs, a mobile terminal can then delete parameters for all flows that have not been flagged as being updated or added within the sequence. Sequence numbers can be applied to the transmission of all BSPMs, whether full, partial, or differential, or there may be a unique sequence number for each type of BSPM. A mobile terminal is then able to determine from the sequence number of a received BSPM whether or not it has missed receiving a recent BSPM. The mobile terminal can then continue to use its stored BSPM parameters or to delete all of its stored parameters. By including within a BSPM history information for previously transmitted BSPMs, a mobile terminal can correctly update its parameters.

In another embodiment, no indication of type is included within each BSPM. A mobile terminal receiving a BSPM, whether full, partial or differential, then updates flow parameters or adds new flow parameters as they arrive. Flow parameters may be deleted according to a defined procedure. For example, if a flow parameter is not updated within a predetermined time, the stored parameters for such a flow may then be deleted.

BRIEF DESCRIPTION OF THE DRAWING

The present invention will be better understood from reading the following description of non-limiting embodiments, with reference to the attached drawings, wherein below.

DETAILED DESCRIPTION

Although the following description is described as based on a generic wireless communication network or system supporting Broadcast-Multicast services (BCMCS), and will be described in this exemplary context, it should be noted that the exemplary embodiments shown and described herein are meant to be illustrative only and not limiting in any way. As such, various modifications will be apparent to those skilled in the art for application to wireless communication systems or networks based on 3G-1x EV-DO, 3G-1x EV-DV and UMTS technologies that may currently support or be adapted to support BCMCS, for example, and are contemplated by the teachings herein.

Additionally where used below, the term "mobile terminal" may be considered synonymous with user equipment, subscriber, BCMC-capable mobile terminal, BCMC subscriber, user, remote station, mobile station, access terminal, etc., and describes a remote user of wireless resources in a wireless communication network. Groups of BCMC-capable mobile terminals of BCMCS may be occasionally referred to as a 'BCMC group' or 'multicast group' for purposes of brevity.

The term 'base station' may be considered synonymous to a Node-B (as defined in UTRAN), and describes equipment that provides data connectivity between a network and one or more mobile terminals. A system or network (such as an access network) may include one or more base stations.

Point-to-multipoint services such as BCMCS allow data from a single source entity to be transmitted to multiple endpoints. BCMCS is intended to efficiently use radio/network resources in transmitting data over a radio channel. Data may be transmitted to multicast areas as defined by the network. A network may selectively transmit BCMC content on sectors within the multicast area that contains members of a multicast group, such as a BCMC group of BCMC-capable mobile terminals.

A BCMCS received by a user may involve one or more successive multicast sessions. For example, a BCMCS might consist of a single on-going session (e.g. a multimedia stream) or may involve several intermittent BCMCS sessions over an extended period of time (e.g. messages). Applications that may take advantage of BCMCS, and hence, of the exemplary embodiments of the present invention, may include, but are not limited to, voice dispatch or Press-To-Talk (PTT) type services, broadcast/multicast streaming, videoconferencing, corporate communications, distance learning, online bidding, online gaming and distribution of software, stock quotes, and news, etc.

Figure 1:
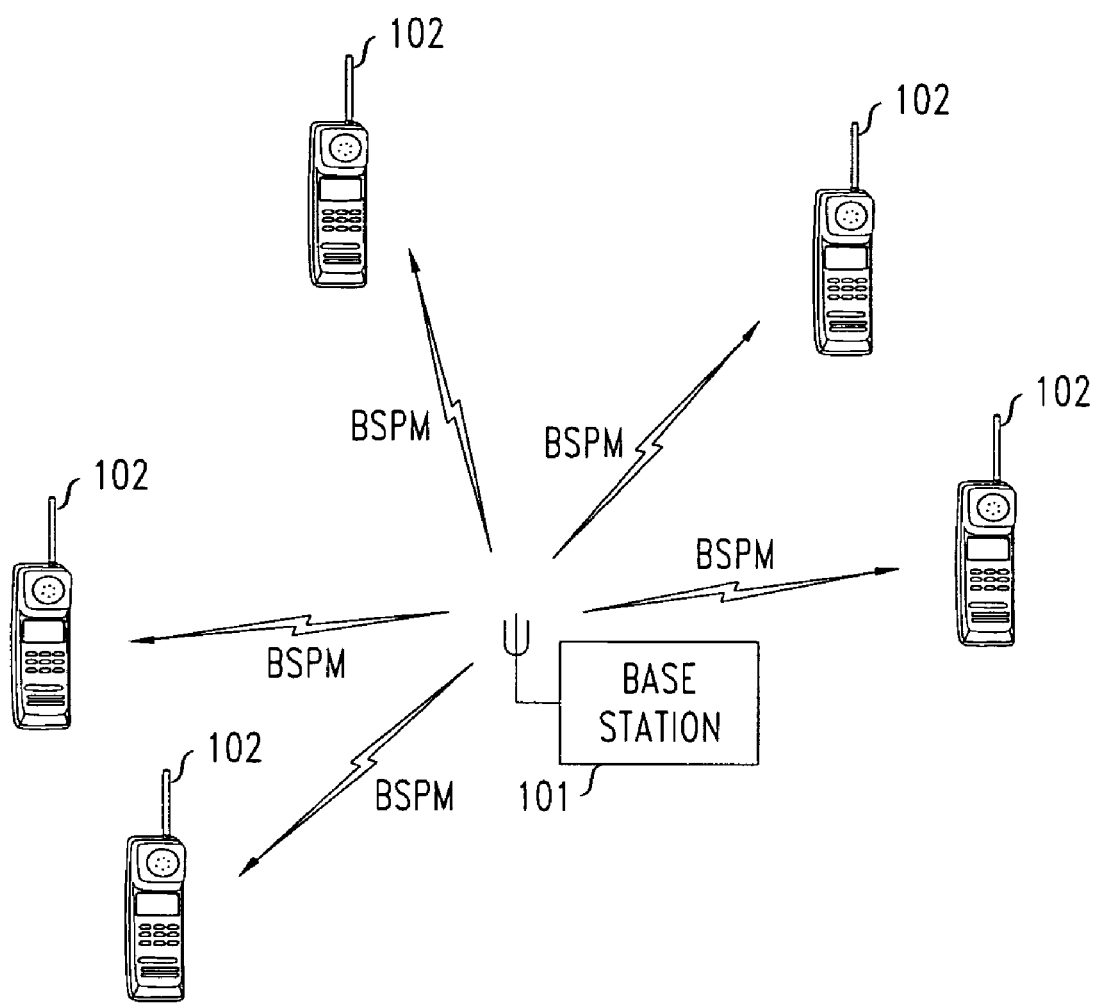
FIG. 1 shows a base station sending BSPMs downlink to a plurality of BCMCS-capable mobile terminals.

FIG. 1 shows a wireless communications system in which one or more multicast services are being provided to BCMC-capable mobile terminals 102 within a sector of base station 101. Base station 101 send BSPMs as an overhead message on a signaling channel downlink to these mobile terminals 102 in its service area. As previously noted, BSPMs indicate what multicast services are currently available to the receiving BCMC-capable mobile terminals 102 and information for accessing these services. As noted, a full BSPM may be exceedingly long since it may be comprised of many parameters required for the reception of BCMC content, The ability to transmit less than a full BSPM will overcome many of the limitations associated with full BSPM transmission. For example, if the transmission of a new BCMC flow were to commence or stop, or if the service parameters for a particular flow were to be modified (e.g. reconfiguration of the logical to physical channel mapping for the flow, activation or deactivation of the flow in a neighbor sector which impacts soft-combining at the mobile terminal etc.), then it is not necessary to retransmit the full BSPM; rather, information for that BCMC flow alone can be transmitted. In this way, the forward link is made more efficient and potentially enables more frequent BSPM transmissions and reduced latencies. Furthermore, for cases where the full BSPM is too long to send in a single transmission, it is useful to send a sequence of partial BSPMs over multiple transmissions that together comprise the full BSPM. In fact, the ability to send less than a full BSPM can possibly obviate the need to transmit full BSPMs altogether.

Figure 2:
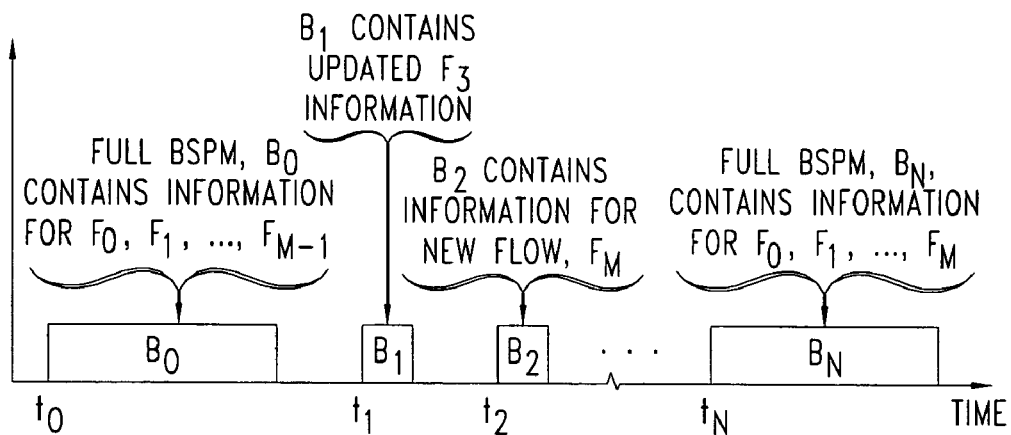
FIG. 2 shows a partial BSPM example.

BSPMs that include information for a subset of all BCMCS flows are termed partial or differential BSPMs. Parameters contained in differential BSPMs are used to update parameters for existing flows and/or provide parameters for new flows that will be carried in the sector. Consider the case, where a mobile terminal begins to monitor a flow $F_1$ at time $t_0$. At time $t_1$, a differential BSPM that indicates a change to the parameters for flow $F_1$ is transmitted by the base station to all the mobile terminals in its sector. The mobile terminal processes the differential BSPM, updates its parameters for flow $F_1$, and resumes monitoring flow $F_1$. FIG. 2 demonstrates the transmission of full and differential BSPMs, where full BSPMs may be long and may be sent less frequently. Since differential BSPMs contain updated information for existing flows or information for new flows only, they may be transmitted more frequently. As can be noted, the full BSPM, $B_0$, transmitted at time $t_0$ contains information for the flows $F_0, F_1, \ldots, F_{M-1}$. At time $t_1$ a differential BSPM, $B_1$, is transmitted containing updated information for flow $F_3$. At a later time $t_2$, another differential BSPM, $B_2$, containing information for a new flow, $F_M$, is transmitted. At time $t_N$, a full BSPM, $B_N$, containing information for all the flows $F_0, F_1, \ldots, F_M$ is transmitted. By transmitting relatively small-sized differential BSPMs, updated information for existing flows or information for new flows can be transmitted more frequently than can full BSPMs, which because of their size, are only transmitted infrequently.

Figure 3:
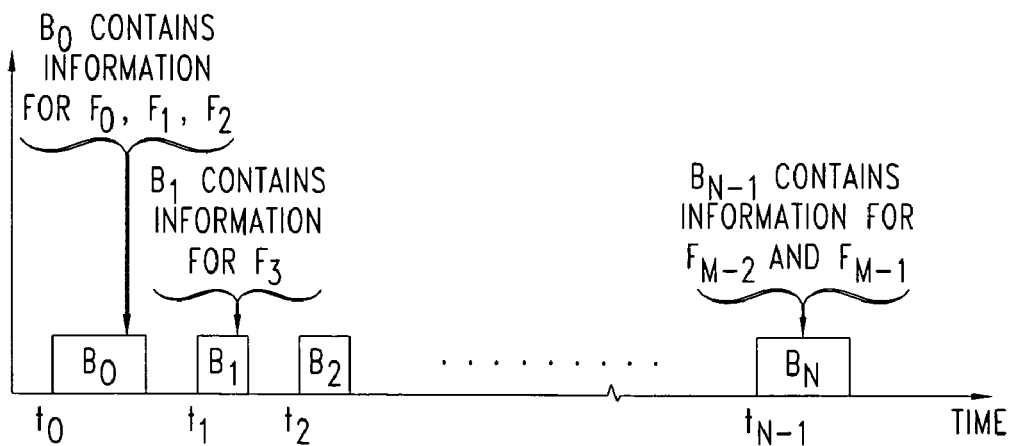
FIG. 3 shows a differential BSPM example.

Partial BSPMs differ from differential BSPMs in that multiple partial BSPMs can be transmitted by the base station and used by mobile terminals to reconstruct the full BSPM. Consider the case illustrated in FIG. 3, where the full BSPM is too long to be sent in a single transmission. As a result, the full BSPM is divided in N segments that are transmitted as partial BSPMs $B_0, B_1, \ldots, B_{N-1}$, at different times, $t_0, \ldots, t_{N-1}$, respectively. Thus, at time $t_0$, $B_0$ contains information for flows $F_0, F_1, F_2$, at time $t_1$, $B_1$ contains information for $F_3$, etc., until time $t_{N-1}$ when $B_{N-1}$ contains information for flows $F_{M-2}$ and $F_{M-1}$. A receiving mobile terminal processes each of these N partial BSPMs. After processing the last BSPM, $B_{N-1}$, at time $t_{N-1}$, the mobile terminal is then aware that it has all the current BCMCS parameters for flows in the current sector. Based on the information that is contained in the reconstructed full BSPM, the mobile terminal may perform certain procedures. For instance, a mobile terminal may be disallowed to register for a flow of interest until after it has received the full BSPM and has verified that the flow is not being carried.

Differential and partial BSPMs can be distinguished from full BSPMs in many ways. In one instance, flag(s) of variable number of bits in the BSPM can be included and set depending on whether the current BSPM is differential, partial, or full. Furthermore, for partial BSPMs, signaling is included in the BSPM to indicate the sequencing of the partial BSPMs. For instance, the first partial BSPM (e.g. BSPM $B_0$ sent at $t_0$) and/or the last partial BSPM (e.g. BSPM $B_{N-1}$ sent at $t_{N-1}$) in a sequence may be identified. Alternatively, a sequence number included in the BSPM and indicated by [log2(N)] bits may be used to identify the sequencing of partial BSPMs. This method of sequencing may be used in addition to first and/or last partial BSPM flags.

In another instance, a flag may be used to indicate whether the current BSPM is full. In case the BSPM is not full, a sequence number may be used to indicate the sequencing of partial BSPM segments with a reserved sequence number value denoting that the BSPM is differential. For example, if a 3 bit sequence number is employed, the value '000' may denote a differential BSPM while sequence numbers in the range '001' to '111' may denote an ordered sequence of partial BSPM segments. The first and/or last partial BSPM segment in the sequence may be additionally indicated through a separate flag (1 or 2 bits).

Note that in all of the above instances, full, differential or partial BSPMs may include a small number of service parameters that are not flow-specific in addition to flow specific parameters. Also, a differential or partial BSPM can be used to page one or more mobile terminals at the start of a BCMC flow or to end a BCMC flow. Further, a differential or partial BSPM can be used in place of a group page or to provide supplementary information to a group page.

Figure 4:
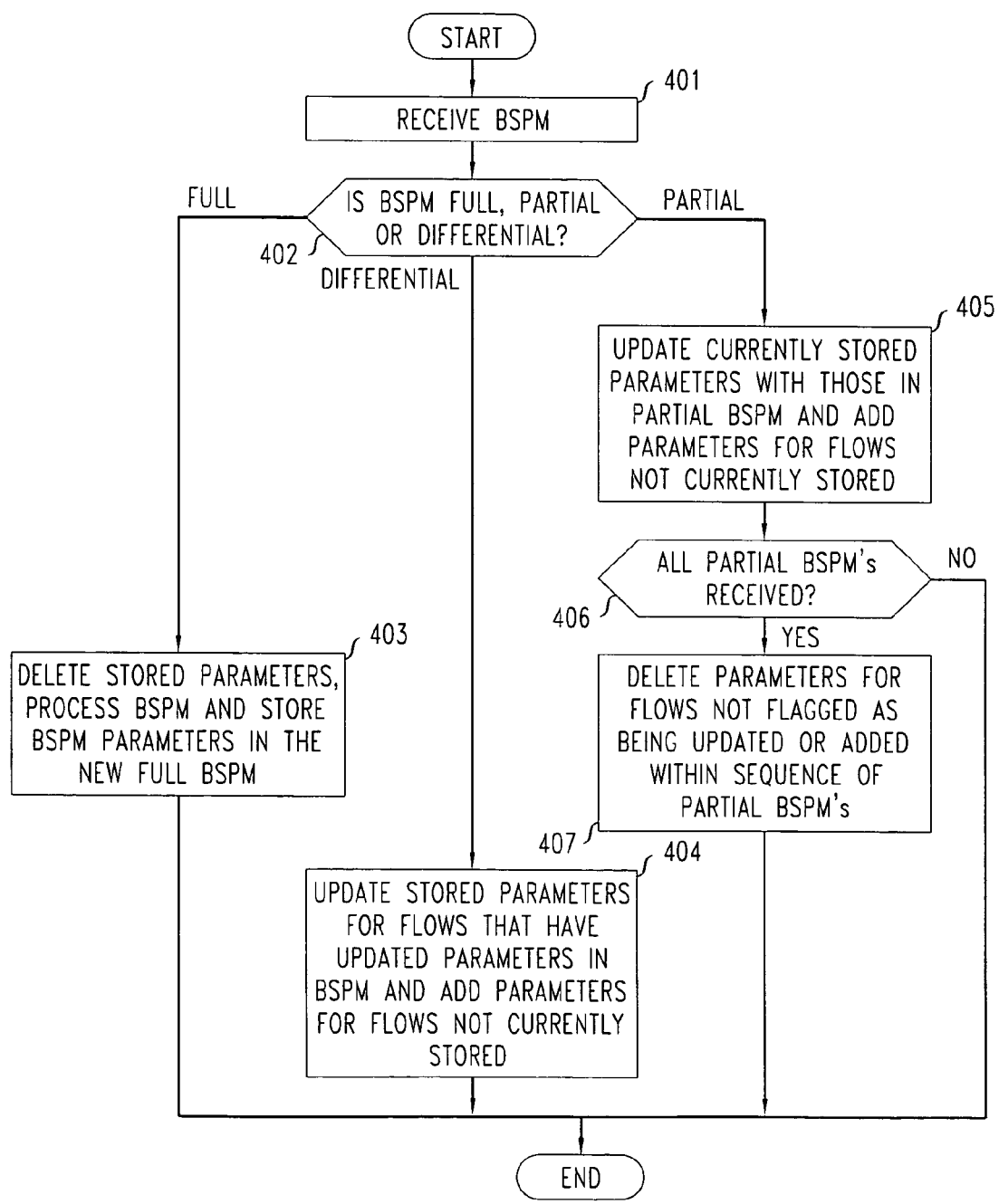
FIG. 4 is a flowchart showing the procedures performed at a mobile terminal in response to receiving a BSPM.

FIG. 4 illustrates processing of a received BSPM at a mobile terminal. At step 401, the mobile terminal receives a BSPM from the base station. At step 402, the mobile terminal then determines if the BSPM is full, partial, or differential. If the BSPM is determined to be a full BSPM, then, at step 403, the mobile terminal deletes its stored BSPM parameters, processes the new full BSPM, and stores the BSPM parameters in the new full BSPM. It then awaits receipt of another BSPM. If, at step 402, the BSPM is determined to be a differential BSPM, then, at step 404, the mobile terminal updates those currently stored parameters for flows that have updated parameters in the received differential BSPM. If the differential BSPM contains information for flows that are not currently stored, then these parameters are added to the current set of stored parameters. After processing of the received differential BSPM, the mobile terminal awaits receipt of the next BSPM from the base station. If, at step 402, the BSPM is determined to be a partial BSPM, then, at step 405, the mobile terminal updates the currently stored parameters with the contents of the partial BSPM. In particular, if the partial BSPM contains parameters for BCMC flows that are currently stored by the mobile terminal, then these parameters are updated with the parameters contained in the partial BSPM. If the partial BSPM contains information for flows that are not currently stored, then these parameters are added to the current set of stored parameters. The mobile terminal keeps a record of all newly stored or updated flows by flagging these updated or newly stored flows. As each partial BSPM is processed, a determination is made, at step 406, whether all partial BSPMs have been received. If they have not, then the mobile terminal awaits receipt of the next partial BSPM. If all partial BSPMs have been received, then, at step 407, the mobile terminal deletes the parameters for all flows that have not been flagged as being updated or added within the sequence of partial BSPMs. The mobile terminal then awaits receipt of a new BSPM from the base station.

In an alternative embodiment, the mobile terminal does not need to determine whether the BSPM is full, partial, or differential. Rather, it simply updates its stored BSPM parameters with the information in the received BSPM, whether it be full, partial or differential. In particular, if stored flows and parameters are included in the BSPM, then these parameters are updated with the parameters contained in the BSPM. If the BSPM contains information for flows that are not currently stored, then these parameters are added to the current set of stored parameters. If a flow has not been updated for a predetermined time duration, then the stored parameters for that flow are deleted.

The following example in Table 1 illustrates a case where full and differential BSPMs are transmitted and are distinguished from each other through a single Differential Indicator (DI) bit included within the BSPM. DI=0 denotes a full BSPM while DI=1 denotes a differential BSPM.

TABLE 1

| Time, t, in seconds | Base station action | Mobile terminal action |
|---|---|---|
| t = 0 (Flows active in the sector are A, B, C, D and E; mobile terminal (MT) attempting to acquire BSPM for the first time within the sector) | Full BSPM transmitted, with DI = 0. BSPM carries signaling information for all the flows. | MT saves the signaling information for flows A, B, C, D and E. It also assumes that these are the only flows being carried in the sector. |
| t = 1 Signaling information for flow B changes. | Differential BSPM transmitted with DI = 1. BSPM contains signaling information for flow B only. | MT updates the signaling information for flow B only. It leaves the saved information for the other flows untouched. |
| t = 2 Flow X is activated | Differential BSPM transmitted, with DI = 1. BSPM contains signaling information for flow X only. | MT adds the signaling information for flow X to its stored parameters. It leaves the saved information for the other flows untouched. |
| t = 3 Flow E is no longer carried. | Full BSPM transmitted, with DI = 0. Flows active in the sector are now A, B, C, D and X. BSPM carries signaling information for all these flows. | MT saves the signaling information for flows A, B, C, D and X and deletes the information for flow E. Thus, it overwrites the previous information entirely. |

The following example illustrates a case where a single Differential Indicator (DI) bit, a 2 bit partial BSPM segment sequence number (PARTIAL_BSPM_SEQ), and a LAST_PARTIAL flag that denotes the last partial BSPM segment are used by the base station to indicate full, differential and partial BSPMs. DI=0 denotes a full BSPM while DI=1 denotes a partial or differential BSPM. If DI=1, the PARTIAL_BSPM_SEQ field is included; PARTIAL_BSPM_SEQ='00' is used to denote a differential BSPM while PARTIAL_BSPM_SEQ='01', '10' and '11' are used to denote an ordered sequence of partial BSPM segments. The LAST_PARTIAL flag is included in the BSPM if PARTIAL_BSPM_SEQ does not equal '00'; LAST_PARTIAL=1 denotes that the partial BSPM segment is the last one in the sequence while LAST_PARTIAL=0 denotes that the BSPM is either the first or intermediate partial BSPM segment of a sequence.

TABLE 2

| Time, t, in seconds | BS action | MS action |
|---|---|---|
| t = 0 (Flows active in the sector are A, B, C, D and E, say; MT attempting to acquire BSPM for the first time within the sector) | Full BSPM transmitted with DI = 0. BSPM carries signaling information for all the flows. | MT saves the signaling information for flows A, B, C, D and E. It also assumes that these are the only flows being carried in the sector. |
| t = 1 Flow X is activated | Differential BSPM transmitted with DI = 1 and PARTIAL_BSPM_SEQ = '00'. BSPM contains signaling information for flow X only. | MT adds the signaling information for flow X to its stored parameters. It leaves the saved information for the other flows untouched. |
| t = 2 Flow E is no longer carried | Partial BSPM transmitted with DI = 1, PARTIAL_BSPM_SEQ = '01' and LAST_PARTIAL = 0. BSPM contains signaling information for flows A, B and C only. | MT updates the signaling information for flows A, B and C only. It leaves the saved information for the other flows untouched. |
| t = 3 Signaling information for Flow B is updated | Partial BSPM transmitted with DI = 1, PARTIAL_BSPM_SEQ = '10' and LAST_PARTIAL = 1. BSPM contains signaling information for flows B, D and X only | MT updates the signaling information for flows B, D and X only. Upon realizing that this is the last partial segment and that information for flow E has not been indicated in the sequence of partial segments, MT deletes the information for flow E. It leaves the saved information for the other flows untouched. |

As previously noted, the BSPM may include message sequence number(s) that help the mobile terminal determine whether a previous BSPM was missed. This message sequence number may apply to the transmission of all BSPMs, whether full, partial, or differential, or there may be a unique sequence number for different classes of BSPMs. In the latter case, there are many possibilities. For instance, there may be a sequence number that applies only to full BSPMs. In another instantiation, there may be a sequence number that applies to full BSPMs and a separate sequence number that applies to differential BSPMs.

If the mobile terminal determines that it has not received a recent BSPM (e.g. based on message sequence numbers), the mobile terminal may determine that its stored BSPM parameters are not up-to-date. Based on this ambiguity, the mobile terminal may continue to use its stored BSPM parameters and risk operating on incorrect parameters. For instance, the mobile terminal may tune to a radio channel that no longer carries the BCMC flow of interest. Alternatively, the mobile terminal may choose to delete all its stored parameters, perhaps causing interruption or delay of service. This problem may be mitigated by additionally including history information for previously transmitted BSPMs within the BSPM. This history may contain sequence numbers for previously transmitted BSPMs and/or the information for the flows that were included in those BSPMs. In this way, the mobile terminal can correctly update its parameters and avoid the consequences associated with stored BSPM parameter ambiguity.

Although embodiments of the present invention have been described in conjunction with BSPMs, the present invention could also be more generally employed for any overhead message transmitted on a signaling channel downlink by a base station to a mobile terminal, where such overhead messages contain information that needs to be provided to the mobile terminal in a base stations service area relating to the services being provided on the wireless network. Thus, these overhead messages, due to their length, could be better served from an efficiency standpoint in being transmitted as a sequence of plural partial overhead messages that together provide all the parameters that need to be provided downlink for all the services being provided, or one or more differential overhead messages that each provide updated parameters for one or more provided services, or parameters for new services being provided.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the mobile terminal, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention it is therefore contemplated that the appended claims will cover any such modifications or embodiments as fall within the true scope of the invention.

The invention claimed is:

1. In a wireless communications network that supports Broadcast-Multicast (BCMC) Services (BCMCS), a method comprising the steps of:
   transmitting at least one differential BCMC Services Parameters Messages (BSPM) containing updated information for one or more existing BCMC flows and information for one or more new BCMC flows; and
   transmitting a sequence of plural partial BSPMs, each partial BSPM containing information for one or more different BCMC flows, the sequence of plural partial BSPMs together containing information for all existing BCMC flows.

2. The method of claim 1 wherein at least one of the differential or partial BSPM is used to page one or more mobile terminals at the start of the BCMC flow or to end the BCMC flow.

3. The method of claim 1 wherein at least one of the differential or partial BSPM is used in place of a group page or to provide supplementary information to the group page.

4. The method of claim 1 wherein each of the BSPM includes an indication of whether it is the differential BSPM or the partial BSPM.

5. The method of claim 1 further comprising the step of:
transmitting a full BSPM containing information for all the existing BCMC flows, the full BSPM being transmitted less frequently than the differential or the partial BSPMs are transmitted.

6. The method of claim 5 wherein each of the BSPM includes an indication of whether it is the full BSPM, the differential BSPM, or the partial BSPM.

7. The method of claim 1 wherein the partial BSPM in the sequence of partial BSPMs includes at least one of an indication that it is the first partial BSPM in the sequence of partial BSPMs, and an indication that it is the last partial BSPM in the sequence of partial BSPMs.

8. The method of claim 1 wherein each of the partial BSPM includes an indication of its position in the sequence of partial BSPMs.

9. The method of claim 1 wherein each of the differential BSPM and partial BSPM includes a sequence number that is unique to the type of BSPM.

10. The method of claim 5 wherein each of the full BSPM, differential BSPM and partial BSPM includes a sequence number that is unique to the type of BSPM.

11. The method of claim 1 wherein the BSPM includes history information for previously transmitted BSPMs.

12. The method of claim 11 wherein the history information contains at least one of a sequence number for the previously transmitted BSPMs, and information for the flows that were included in those previously transmitted BSPMs.

13. In a wireless communications network that supports Broadcast-Multicast (BCMC) Services (BCMCS), a method comprising the steps of:
receiving a BCMC Services Parameters Messages (BSPM) together with an indication that the BSPM is a partial BSPM that is one in a sequence of plural partial BSPMs that the partial BSPM contain information for one or more different BCMC flows and wherein the sequence of plural partial BSPMs together contains information for all existing BCMC flows.

14. The method of claim 13 further comprising:
replacing the stored BCMC flow information with updated flow information contained in the partial BSPM.

15. The method of claim 14 further comprising:
determining whether the received BSPM is the partial BSPM is the last in the sequence of partial BSPMs, and if it is the last in the sequence of partial BSPMs, deleting the stored BCMC flow information that have not been updated or added in the sequence of BSPMs.

16. The method of claim 14 wherein the received partial BSPM also contains a sequence number that is unique to the type of received BSPM, the method further comprising the step of determining from the sequence number in the received partial BSPM whether a previous BSPM has not been received.

17. The method of claim 16 wherein if it is determined that the previous partial BSPM has not been received, deleting the stored information for all flows.

18. The method of claim 16 wherein if it is determined that the previous partial BSPM has not been received, continuing to use the information for flows contained in the received partial BSPM and previously stored information.

19. The method of claim 16 wherein if it is determined that the previous partial BSPM has not been received, using history information contained in received partial BSPMs to update the flow information.

20. In a wireless communications network, a method comprising:
transmitting a differential overhead message containing at least one of updated parameters for services provided by the network and parameters for new services being provided by the network; and
transmitting a sequence of partial overhead messages, each partial overhead message containing parameters for one or more different services being provided by the network, the sequence of partial overhead messages together containing parameters for all the services provided by the network.

21. The method of claim 20 wherein each of the overhead messages include an indication that it is the partial overhead message.

22. In a wireless communications network, a method comprising the steps of:
receiving an overhead message together with an indication that the overhead message is a partial overhead message that is one in a sequence of plural partial overhead messages that the partial overhead contains parameters for one or more different services being provided by the network and wherein the sequence of plural partial overhead messages together contains parameters for all existing services being provided.

23. The method of claim 22 further comprising:
replacing the stored parameters with updated parameters contained in the partial overhead message.

* * * * *